United States Patent [19]

Golder

[11] Patent Number: 4,457,074
[45] Date of Patent: Jul. 3, 1984

[54] METHOD AND APPARATUS FOR SYNCHRONIZING THE SENSOR MOVEMENT OF A PITCH AND/OR CONCENTRICITY MEASURING DEVICE FOR GEARS

[75] Inventor: Peter Golder, Ettlingen, Fed. Rep. of Germany

[73] Assignee: Willy Höfler, Karlsruhe, Fed. Rep. of Germany

[21] Appl. No.: 420,504

[22] Filed: Sep. 17, 1982

[30] Foreign Application Priority Data

Oct. 17, 1981 [DE] Fed. Rep. of Germany ....... 3141350

[51] Int. Cl.³ .............................................. G01B 5/20
[52] U.S. Cl. ........................... 33/179.5 R; 33/179.5 D
[58] Field of Search ................... 33/179.5 R, 179.5 D, 33/179.5

[56] References Cited

U.S. PATENT DOCUMENTS

| | | | |
|---|---|---|---|
| 3,522,524 | 8/1970 | Smith et al. | 33/179.5 R |
| 3,800,423 | 4/1974 | Munro et al. | 33/179.5 R |
| 3,950,858 | 4/1976 | Donner et al. | 33/179.5 R |
| 4,276,699 | 7/1981 | Sterki et al. | 33/179.5 R |
| 4,285,133 | 8/1981 | Sterki et al. | 33/179.5 R |
| 4,297,788 | 11/1981 | Sterki et al. | 33/179.5 R |
| 4,356,556 | 10/1982 | Sterki | 33/179 R |

FOREIGN PATENT DOCUMENTS

| | | |
|---|---|---|
| 1187700 | 12/1964 | Fed. Rep. of Germany ..... 33/179.5 R |
| 1423570 | 8/1971 | Fed. Rep. of Germany ..... 33/179.5 R |
| 2412574 | 3/1978 | Fed. Rep. of Germany ..... 33/179.5 R |

Primary Examiner—Willis Little
Attorney, Agent, or Firm—Spencer & Frank

[57] ABSTRACT

A method for synchronizing the sensor movements of a pitch an/or concentricity measuring device for gears, wherein the sensor enters into gaps between teeth on the rotating gear, the measurement is made and then the sensor is retracted until the next gap has appeared in front of the sensor. The sensor movement is synchronized with the rotary movement of the gear by utilizing the output signals from the sensor to provide a measurement of the rate of rotation of the gear at the onset of the period when it is being carried along and, under consideration of the known gear parameters, using this measurement to automatically calculate the waiting period during which the sensor must be held in its retracted position before the next gap will arrive. An apparatus for determining the rate of rotation by measuring the time required for the sensor to traverse a given path length and to then control the sensor movement on the basis of the waiting period calculated from the determined rate of rotation is also disclosed.

9 Claims, 1 Drawing Figure

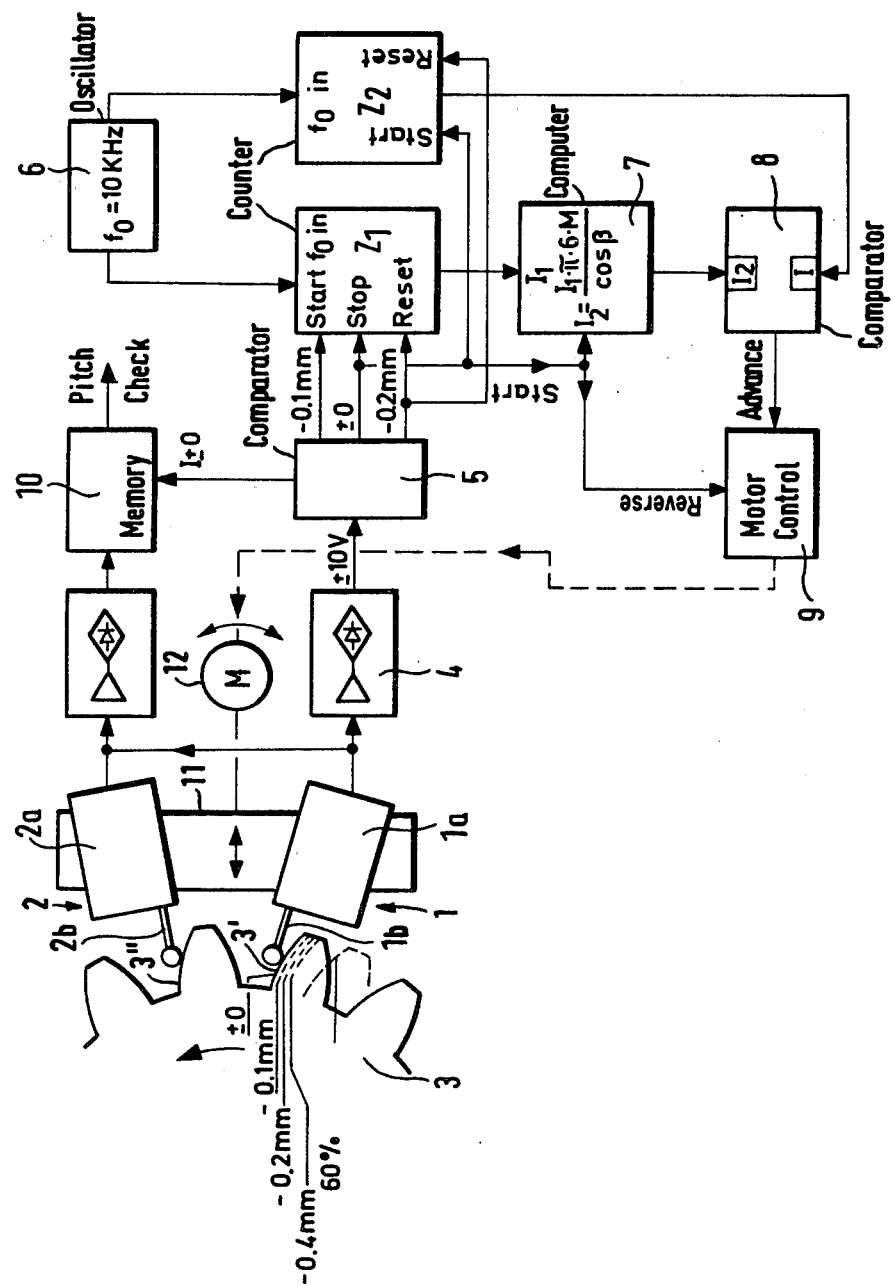

METHOD AND APPARATUS FOR SYNCHRONIZING THE SENSOR MOVEMENT OF A PITCH AND/OR CONCENTRICITY MEASURING DEVICE FOR GEARS

BACKGROUND OF THE INVENTION

The present invention relates to a method for synchronizing the sensor movement of a pitch and/or concentricity measuring device for gears, wherein at least one sensor is inserted radially into the gap between the teeth of the rotating gear to be tested and is carried along by the gear tooth for a section so as to measure the pitch and concentricity of the gear and, after the measurement, is automatically retracted, the waiting period of the sensor in its retracted position and the renewed insertion into the next tooth gap being controlled by a computer which is coupled with a timer. The invention also relates to an apparatus for implementing this method.

Pitch and/or concentricity measuring devices for gears have in the meantime been substantially automatized with respect to the measuring process. Thus it is known from DE-OS No. 2,123,960, laid open Feb. 17th, 1972, to feed the measured values to an electronic evaluation device which, from the individual measured values, calculates the absolute pitch errors, jumps in pitch and the sum pitch error. It is further known from DE-AS No. 2,412,574, published Mar. 16th, 1978, to provide a pitch measuring device with a process memory which not only performs the error evaluation but also controls the movement of the sensor in dependence on the rotary movement of the gear to be tested.

A basic drawback of these prior art devices is, however, that at the beginning of the measuring process, an operator must manually synchronize the lateral or radial sensor movement with the rotary movement of the gear to be tested so that it is assured that the advancing sensor enters into a gap between the teeth and does not abut against a tooth. Synchronization is effected in that the operator depresses a synchronizing key at the moment when the sensor faces a gap between two teeth, and this synchronizing key remains depressed until the next tooth gap is in front of the sensor. This manual synchronization process requires good visual acuity and fast reaction, particularly if the gaps between teeth are relatively small or if the gears are mounted on relatively fast moving turntables.

The same applies for all other known pitch and/or concentricity measuring devices (for example DE-PS No. 1,432,570, issued Aug. 26th, 1971) if they are used for gears having different dimensions.

SUMMARY OF THE INVENTION

It is therefore the object of the present invention to simplify the above-described process with respect to manual synchronization. In a further feature of the invention, the opportunity is given to automatically compensate for fluctuations in speed of the gear being tested.

The above object is achieved according to the present invention in that in a method of measuring the pitch and/or concentricity of a gear as described above, during the time the sensor is carried along and deflected by the rotating gear, the rate of rotation of the gear is determined from the signals produced by the sensor during an associated period of time, and this information and the known gear parameters are used to calculate the waiting period for the sensor associated with a given path of rotation of the gear.

The rate of rotation of the gear is determined either by measuring the time during which the sensor is carried along and deflected over a given path length, or by measuring the length of the path traversed by the sensor during a given period of time.

Preferably the known gear parameters are stored in a computer which in turn carries out the calculation of the desired waiting period.

The invention is based on the realization that the previously required manual synchronization can be simplified considerably if the rate of rotation of the gear is measured and, with the known pitch data, the waiting period for the sensor in its retracted position is calculated therefrom. Of course, the speed need not be calculated explicitly, it is sufficient to make a path/time association from which the waiting time associated with the given rotary path can then be calculated.

If this process is applied in every tooth gap there automatically results a consideration of possible fluctuations in the rate of rotation of the gear being tested as it may occur mainly in simpler table drives where changes in rmp from +10% to −15% may occur according to permissible voltage fluctations of the power mains.

The invention offers the advantage that it is merely necessary to give a start order once a tooth gap is in front of the sensor. Determination of the waiting time and synchronization occur automatically, independently of how fast the gear to be tested is rotating and independently of possible changes in rpm.

Moreover, in numerous cases of pitch measurements, there then exists the possibility of omitting the manual actuation of the first insertion movement of the sensor and instead to position the sensors directly into the corresponding tooth gaps while the gear is at rest. This is possible in cases where the path of rotation of the gear from the switch-on position until its side being tested rests against the sensor is long enought so that the gear will reach almost its final speed along that path. The rotary drive for the gear can then be switched on at any desired moment, with the correct synchronization resulting automatically as described above.

In practice it has been found to be favorable for the path or time measurement at a sensor which is moved or carried along by the rotating gear to be made only after the sensor has moved or traversed over an initial passive short path, because the impact made by the sensor against the side of the gear at the beginning of its travel may lead to vibrations which adversely influence the accuracy of the path or time measurement. If, as is preferably the case according to the present invention, the measurement is made only after a certain quieting-down path, i.e. after the traversal of the initial passive path, such vibrations will have died down.

Since the pitch measurement employs a sensor in any case which, after a given deflection movement, actuates the pitch measurement, it is preferable to provide a certain path length for measuring the rate of rotation of the gear and to measure the period of time during which the sensor is carried or moved over this given path, in order to achieve the desired synchronization according to the invention. Advisably the given path length for the time measurement is equal to or less than 1 mm.

If the gear to be tested has very deep gaps or is attached to a very fast rotating turntable, the times required to insert and retract the sensor may be significant factors. In such a case, it is recommended that the computer shorten the waiting period by the time required to insert and retract the sensor. These two times are constants for the device and are thus known. They can also be considered by the computer in the computation of the waiting time.

Various circuitry schemes are available to implement the method according to the invention. If a mechanically tensioned or biased sensor is used which generates a signal proportional to its deflection and actuates the pitch or concentricity measurement at a given deflection, it is particularly favorable to switch on a counter at a given lesser deflection of this sensor and to stop this counter at a given greater deflection, to connect this counter to a computer in which is stored the pitch of the gear to be tested and the rotary path desired to be traversed by the gear during the waiting time and to connect the output of this computer to a comparator which compares the waiting time calculated by the computer with the time information from a further counter which starts when the sensor is retracted and causes the sensor to advance when there is coincidence.

BRIEF DESCRIPTION OF THE DRAWING

The FIGURE is a block circuit diagram of a pitch measuring device provided with a synchronizing arrangement according to the invention.

DETAILED DESCRIPTION OF THE PREFERRED EMBODIMENT

Referring now to the drawing FIGURE, there is shown schematically two sensors 1 and 2, each including a signal generating circuit 1a or 2a and a pivotally mounted sensing element 1b or 2b, respectively. The sensors 1 and 2 are disposed in a known manner on a carriage 11 which is movable in a forward or reverse direction (as indicated by the doubled ended arrow on the carriage 11) by means of a motor 12 so that the sensors 1 and 2 can be moved radially toward and away from the periphery of a gear 3 and into and out of the gaps between the teeth of gear 3. The sensors 1 and 2 are designed, in the customary manner, as pivotal signal generators and generate a signal proportional to the deflection of the sensor elements 1b and 2b so that when they contact the sides of the teeth being measured, their distance from one another, i.e. the pitch, is displayed.

Generally the pitch measurement is effected in that the two sensor elements 1b and 2b are carried along over a certain path by the teeth of the rotating gear 3 and the deflection of one sensor element, in the illustrated embodiment the deflection of sensor element 1b, is used to actuate the pitch measurement. For this purpose, sensor element 1b is mechanically tensioned and sensor 1, and in particular the circuit 1a, produces a negative electrical output signal or bias at the beginning of its deflection movement which, with increasing deflection, goes toward zero and then takes on increasing positive values. At the zero passage of the bias signal produced by signal generating circuit, or inductive path sensor, 1a of sensor 1, the pitch measurement is initiated and the signal generated at this moment by the signal generator or path sensor 2a of sensor 2 is read, processed and printed out in a known manner. The measurement is described for example in the German Pat. No. 1,423,570, laid open for public inspection on Jan. 23, 1969.

In order for the forward and reverse movement of the sensors 1 and 2 to be tuned to or synchronized with the rate of rotation of the gear 3, the output of the path sensor 1a is connected, via a conventional amplifier-demodulator circuit 4 to a triple comparator circuit 5 having three outputs which are connected to and control a counter Z1. The comparator 5 compares the output signal from the circuit 4 with a reference voltage and produces an output signal on its first or second output when its input signal corresponds to a deflection of the sensor element 1b which is 0.2 mm or 0.1 mm, respectively, prior to the desired pitch (or concentricity) measuring position in the illustrated embodiment, and an output signal on its third output when its input signal corresponds to a deflection of the sensor element 1b representing the desired pitch measuring position, i.e. the zero passage of the output signal from sensor 1. In addition to the three control inputs from comparator 5, the counter Z1 has a counting input connected to the output of timer 6, which is in the form of a 10 KHz oscillator, and an output connected to a computer 7 whose output is connected, via a further comparator 8, to the motor control 9 for the forward and reverse movement of the carriage 11 carrying the sensors 1 and 2.

The synchronizing process now takes place as follows: when a tooth gap of gear 3 is in front of each one of the sensors 1 and 2 which are set to the respective pitch, the operator gives the start signal whereupon movement of the carriage 11 in the forward direction is initiated and both sensors 1 and 2 move into their respective tooth gaps of gear 3. Depending on how fast the gear 3 rotates, the two sensing elements 1b and 2b will come into contact, after a few seconds, with the sides 3' and 3", respectively, to be measured and are moved or carried along by these sides 3' and 3" in the circumferential direction of the gear 3. The voltage generated in the path sensors 1a and 2a is thereby changed in proportion with the path traversed. The path sensor 1a, which is designed as a zero switch, is assumed to be initially tensioned by, for example, 0.4 mm prior to the pitch measuring position and thereby furnishes a negative output voltage of $-4$ V. After the sensing elembent 1b has been carried by side 3' of gear 3 over an additional path of, for example, 0.2 mm in the illustrated embodiment, so that the voltage generated by the path sensor 1a is $-2$ V and the sensing element 1b is at a deflection 0.2 mm prior to its desired measuring position, the comparator 5 produces an output signal on one of its outputs which resets the counter Z1, and possibly a further counter Z2 to be described below, to zero. When, after further travel, the sensing element 1b is still 0.1 mm from its zero passage or measuring position, the comparator 5 produces an output signal on another of its outputs which releases counter Z1 to begin to count the pulses fed in by oscillator 6.

At the zero passage of sensor 1, the comparator 5 produces a further output signal which stops the counting by the counter Z1 and causes the number of pulses measured in counter Z1 to be fed into the computer 7. From the path length of 0.1 mm traversed by the side 3' of the tooth of gear 3 and the time, expressed in the number of counted pulses I, required for this path to be traversed, the computer 7 determines the time (likewise expressed in a number of pulses) that must elapse before the next pair of gaps of gear 3 is in front of sensors 1 and 2. If the waiting time is set at 60% of the pitch, the path traversed by the tooth sides during this time is 0.6 $M/\cos \beta$, where M is the modulus of the gear 3 to be tested and the $\beta$ is the slope angle of the tooth.

If, as in the above embodiment, the path used for the time measurement is assumed to be 0.1 mm and the number of pulses measure by counter Z1 is indicated by $I_1$, a number of pulses $$I_2 = I_1 0.6\pi M/0.1 \cos \beta$$

or $$I_2 = I_1 6\pi M/\cos \beta.$$

results for the waiting time or period. This sets the waiting period under consideration of the rate of rotation of the gear 3 and the gear parameters.

At the same time, when sensor 1 passes through zero, the pitch measurement is actuated in the known manner and the signal corresponding to the pitch from the oppositely connected path sensors 1a and 2a is stored in memory 10.

Moreover, during the zero passage of sensor 1, the reversal of the carriage carrying the two sensors 1 and 2 is automatically actuated in the known manner, i.e. a signal indicating the zero passage, e.g. the zero output signal of comparator 5, is fed to the motor control circuit 9.

To match or synchronize the actual waiting times for the sensors 1 and 2 in their retracted position to the waiting time determined by computer 7, a further counter Z2 is provided. This counter Z2 likewise has a counting input connected to the output of oscillator 6 which acts as a timer. Counter Z2 is started either when sensor 1 passes through zero (as illustrated) or only after sensor 1 has reached its retracted position. The output of counter Z2 is connected to the other input of comparator 8 which compares the output signal from counter Z2 with the output signal of computer 7. When counter Z2 reaches the number of pulses $I_2$ calculated by computer 7, the waiting time is completed and comparator 8 provides and iniates an output signal to motor control circuit 9 which causes the advance of the sensors 1 and 2 into the next pair of gaps of the gear 3, whereupon the process is repeated.

Of course, instead of separate counters Z1 and Z2, a single counter can be used which either continues to count or, if the counting of the waiting period beings only in the retracted position of the sensor, is first set to zero.

Thus the described device makes it possible to effect automatic synchronization of the movement of carriage 11 with the rate of rotation of the gear 3 being tested. The operator need only take care, upon switching on the device, that at the point of switch-on a pair of gaps is disposed in front of the two sensors 1 and 2. Even these measures can be omitted if the two sensors 1 and 2 are positioned directly in their pair of gaps when the gear 3 is at rest, and the start-up of the gear occurs so quickly that when the sensors reach the position at the flanks of the teeth, the teeth have reached their final speed. Moreover, for rotary drives experiencing fluctuations in their rate of rotation (rpm), the waiting period is automatically adapted to any changes in the rate of rotation.

If instead of measuring the pitch, only the concentricity of the gears is to be measured, sensor 2 is omitted and instead of a sensor 1 as described above, a generator is used whose spherical end rests with both sides against the sides of the gears and which is equipped with a radial immersion depth gauge. Synchronization is effected in the same manner as in the described pitch measuring device. A suitable concentricity measuring device is manufactured by Dr. Ing. W. Höfler, Messgerätebau GmbH, 7505 Ettlingen, Federal Republic of Germany under Federal Republic of Germany Pat. No. 1,183,700 (Typ EVRM).

It will be understood that the above description of the present invention is susceptible to various modifications, changes and adaptations, and the same are intended to be comprehended within the meaning and range of equivalents of the appended claims.

What is claimed is:

1. In a method for measuring the pitch and/or concentricity of a gear including moving at least one sensor into a measuring position wherein the sensor is inserted into a gap between the teeth of a rotating gear to be measured to cause the sensor to be carried along and deflected by the gear for a certain path and to provide output signals corresponding to the desired measurement, after the measurement, automatically retracting the sensor from the measuring position and, after a waiting period, during which the sensor remains in this retracted position, again inserting the sensor into the next gap to perform a further measurement; the improvement comprising synchronizing the sensor movement between the measuring and retracted positions with the rotation of the gear by: during the time when the sensor is carried along and deflected by the rotating gear, measuring the rate of rotation of the gear being measured from the output signals from the sensor during an associated period of time; from this rate of rotation measurement and from the known gear parameters, determining the sensor waiting time associated with a given rotary path of the gear, and utilizing this determined sensor waiting period to control the sensor movement.

2. A method as defined in claim 1 wherein the rate of rotation of the gear is measured by determining the time during which the sensor is carried along and deflected over a given path length.

3. A method as defined in claim 1 wherein the rate of rotation of the gear is measured by determining the path length traversed by the sensor during a given time period.

4. A method as defined in claim 1, 2 or 3 wherein the waiting period is calculated by a computer from the measured rate of rotation of the gear and the known gear parameters stored in the computer.

5. A method as defined in claim 1, 2 or 3 further comprising initiating the measurement of the rate of rotation from the output signals of the sensor carried along and deflected by the gear only after the sensor has traversed an initial passive carry-along path length.

6. A method as defined in claim 2 wherein the path traversed during the time measurement is equal to or less than 1 mm.

7. A method as defined in claim 6 further comprising initiating the time measurement only after the sensor has traversed an initial passive carry-along path length.

8. A method as defined in claim 1 or 2 further comprising shortening the determined sensor waiting time by the time required for the sensor to move into and out of the gap between the teeth.

9. In an apparatus for measuring the pitch and/or concentricity of a gear including at least one sensor mounted for movement into the gap between the teeth of a rotating gear for deflection by the gear for a certain path to permit the desired measurement, said sensor having means for generating a signal proportional to the deflection of the sensor, means for initiating the desired measurement at a given deflection of the sensor, means for automatically retracting the sensor from its measuring position after the measurement, and means, including a computer coupled to a timer, for controlling the waiting period, during which the sensor remains in its retracted position, and the renewed entrance of said sensor into the next gap; the improvement wherein said means for controlling includes: a pulse oscillator as said timer; a first counter having its input connected to the output of said pulse oscillator; means, responsive to the output signal from said sensor, for causing said first counter to start counting at a first deflection which is lower than said given deflection, and for causing said first counter to cease counting at a second deflection, which is higher than said first value, and to transfer the count to said computer in which are stored the pitch of the gear to be tested and the rotary path desired to be traversed by the gear during the waiting period, said computer calculating the waiting period from the count received from said first counter and said stored data; a further counter having its input connected to the output of said timer; means for causing said further counter to start counting upon the beginning of said retraction of said sensor; and a comparator for comparing the calculated waiting period produced by said computer with the time information represented by the count in said further counter and for actuating the forward movement of said sensor when there is coincidence.

* * * * *